US012681691B2

(12) United States Patent
Yoshimura et al.

(10) Patent No.: US 12,681,691 B2
(45) Date of Patent: Jul. 14, 2026

(54) INPUT DISPLAY DEVICE

(71) Applicant: ALPS ALPINE CO., LTD., Tokyo (JP)

(72) Inventors: Takashi Yoshimura, Fukushima (JP); Yasuhiro Ikarashi, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 19/012,122

(22) Filed: Jan. 7, 2025

(65) Prior Publication Data

US 2025/0238198 A1 Jul. 24, 2025

(30) Foreign Application Priority Data

Jan. 22, 2024 (JP) ................................. 2024-007216

(51) Int. Cl.
G06F 3/041 (2006.01)
G06F 3/16 (2006.01)
G06F 3/044 (2006.01)

(52) U.S. Cl.
CPC .......... G06F 3/167 (2013.01); G06F 3/04166 (2019.05); G06F 3/165 (2013.01); *G06F 3/044* (2013.01); *G06F 2203/04108* (2013.01)

(58) Field of Classification Search
CPC ...... G06F 3/167; G06F 3/04166; G06F 3/165; G06F 3/044; G06F 2203/04108; G06F 3/011; G06F 3/016; G06F 3/017; G06F 3/041; G06F 2203/04101; G06F 3/0304
See application file for complete search history.

(56) References Cited

U.S. PATENT DOCUMENTS

| | | | |
|---|---|---|---|
| 9,654,103 B2 | 5/2017 | Buttolo et al. | |
| 2009/0256814 A1 | 10/2009 | Chung et al. | |
| 2018/0136730 A1 | 5/2018 | Hayashi et al. | |
| 2018/0348960 A1 * | 12/2018 | Shinohara ............ | G02B 6/0068 |
| 2020/0258539 A1 * | 8/2020 | Shim .................... | H04R 1/1083 |
| 2022/0308695 A1 | 9/2022 | Hara et al. | |
| 2024/0036634 A1 | 2/2024 | Takahashi et al. | |
| 2025/0138776 A1 * | 5/2025 | Bae .................... | H04N 21/4341 |

FOREIGN PATENT DOCUMENTS

| | | |
|---|---|---|
| JP | 2018-206149 | 12/2018 |
| JP | 2022-113411 | 8/2022 |
| JP | 2022-147264 | 10/2022 |
| WO | 2019/173781 | 9/2019 |
| WO | 2022/113687 | 6/2022 |
| WO | 2022/158209 | 7/2022 |

OTHER PUBLICATIONS

Extended European Search Report for 25151412.1 mailed on Jun. 25, 2025.
Korean Office Action for 10-2025-0005935 mailed on Dec. 22, 2025.

* cited by examiner

*Primary Examiner* — Towfiq Elahi
(74) *Attorney, Agent, or Firm* — IPUSA, PLLC

(57) ABSTRACT

An input display device for is provided displaying a floating image by utilizing retroreflection, and includes circuitry configured to detect a first event in which an operating object comes in proximity to the floating image, detect a second event in which the operating object moves away from the floating image, output a first sound signal in response to detection of the first event, and output a second sound signal in response to detection of the second event.

10 Claims, 9 Drawing Sheets

FINGER COMES IN PROXIMITY

FINGER MOVES AWAY

BUTTON PRESS DURATION ≥ SOUND SOURCE A PLAYBACK LENGTH

BUTTON PRESS DURATION < SOUND SOURCE A PLAYBACK LENGTH

FINGER COMES IN PROXIMITY

FINGER MOVES AWAY

FIG.10

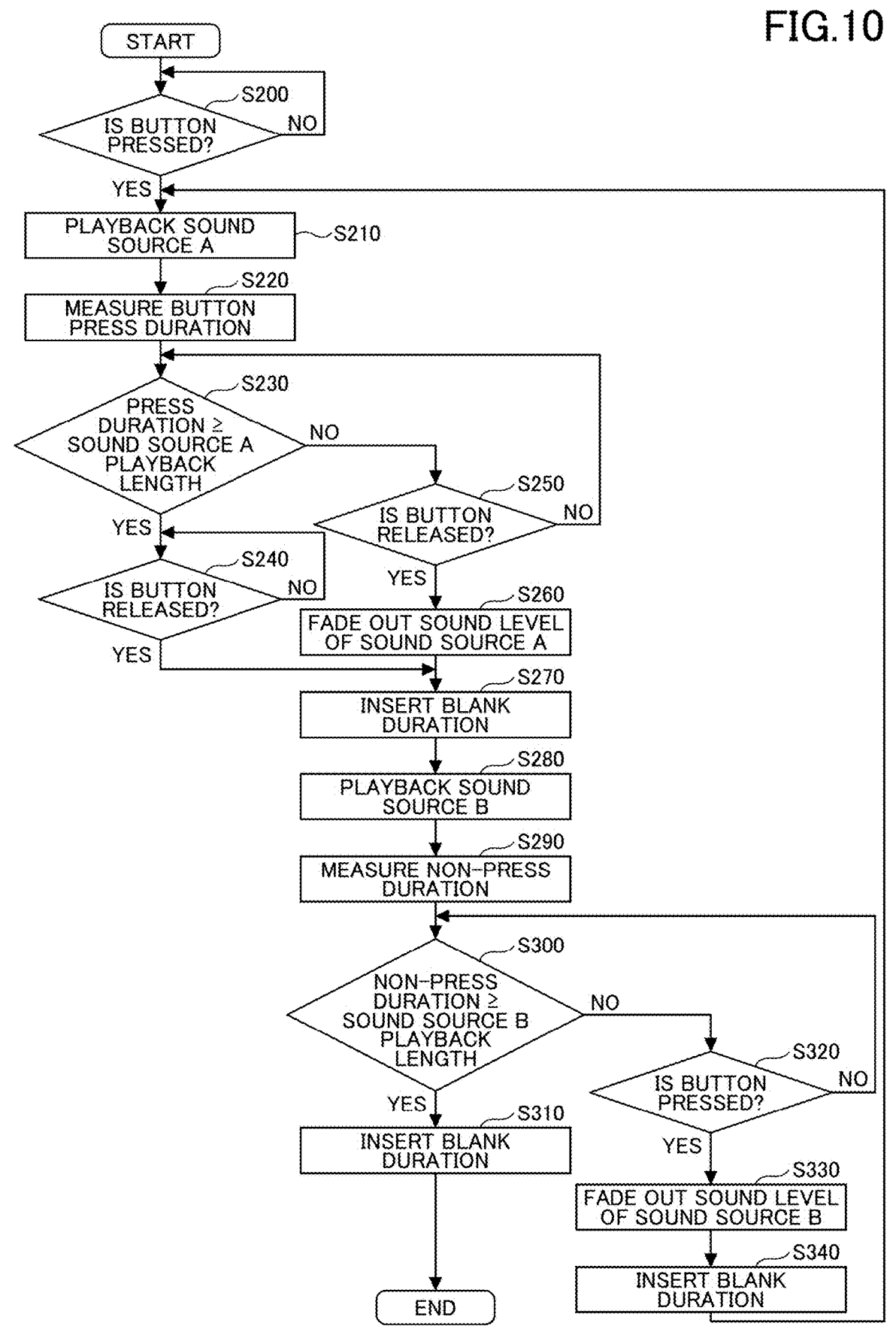

START

S200
IS BUTTON PRESSED?
NO

YES

PLAYBACK SOUND SOURCE A — S210

MEASURE BUTTON PRESS DURATION — S220

S230
PRESS DURATION ≥ SOUND SOURCE A PLAYBACK LENGTH
NO

S250
IS BUTTON RELEASED?
NO

YES

YES

S240
IS BUTTON RELEASED?
NO

YES

FADE OUT SOUND LEVEL OF SOUND SOURCE A — S260

INSERT BLANK DURATION — S270

PLAYBACK SOUND SOURCE B — S280

MEASURE NON-PRESS DURATION — S290

S300
NON-PRESS DURATION ≥ SOUND SOURCE B PLAYBACK LENGTH
NO

S320
IS BUTTON PRESSED?
NO

YES

YES

INSERT BLANK DURATION — S310

FADE OUT SOUND LEVEL OF SOUND SOURCE B — S330

INSERT BLANK DURATION — S340

END

INPUT DISPLAY DEVICE

The present application is based on and claims priority to Japanese patent application no. 2024-007216 filed on Jan. 22, 2024, with the Japanese Patent Office, the entire contents of which are hereby incorporated by reference.

BACKGROUND OF THE INVENTION

1. Field of the Invention

The disclosures herein relate to input display devices in which an input operation is performed on floating images using retroreflection.

2. Description of the Related Art

Aerial imaging by retroreflection (AIRR) is known. For example, an input device of Patent Literature (PTL) 1 recognizes that a user's finger or another object comes in proximity to an image formed in a space and notifies the user by a change of the image. A floating operation device of PTL 2 determines whether a button has been pressed based on a position of an object detected by a sensor, notifies the user about a result of the determination, and changes a display state of the button to a first mode when the position of the object is determined to be located at a first position.

As a floating interface, practical application of an input display device which performs an input operation to a floating image by combining an AIRR type floating optical system and a sensor which detects proximity of an object has been advanced. In such an input display device, manufacture of a modular one which adds ON/OFF illumination and a switch sound as an operation of an input switch has also been advanced.

Related Art FIG. 1A is a perspective view illustrating an example of a conventional input display device, and Related Art FIG. 1B is a drawing illustrating an example of an operation on a floating image of the input display device. The input display device 10 houses an optical system such as a light source and a retroreflecting member in a housing 120 having a beam splitter on its surface, and displays the floating image Q above the housing 120. The input display device 10 also includes a sensor 130 for detecting proximity of a user's finger to the floating image Q, and a speaker for outputting a switch sound when the proximity of the user's finger to the floating image Q is detected. For example, when a design P of an original image is generated by the light source, the floating image Q is displayed in a space floating from the housing 120. In this example, floating images Q indicate numbers 1, 2, 3, and 4.

As shown in Related Art FIG. 1B, the user can perform an input operation on the floating image Q by bringing the user's finger U to the proximity of the floating image Q. For example, when the user wants to input "1", the user brings the finger to the proximity of the "1" as if pressing a floating image Q of "1". The proximity of the user's finger U to the floating image Q is detected by the sensor 130, and in response to this detection, the image of the floating image Q is changed or a switch sound (or operation sound) such as "beep" is output from the speaker in order to notify the user that the input operation to the floating image Q has been recognized.

However, the conventional input display device has the following problem. Since the floating image Q has no substance, it is still difficult to provide the user (operator) with a tactile feedback and confirmation feeling like a physical switch only by outputting the sound or changing the image. This is considered to be due to lack of feedback to the operator and lack of interactivity compared with a mechanical switch operation, and the like.

An object of the present invention is to provide an input display device that enables the input operation to floating image with high the interactivity.

CITATION LIST

Patent Literature

[PTL 1] Japanese Laid-Open Patent Publication No. 2018-206149
[PTL 2] International Publication WO2022/113687

SUMMARY OF THE INVENTION

An input display device for displaying a floating image by utilizing retroreflection, includes circuitry configured to detect a first event in which an operating object comes in proximity to the floating image, detect a second event in which the operating object moves away from the floating image, output a first sound signal in response to detection of the first event, and output a second sound signal in response to detection of the second event.

BRIEF DESCRIPTION OF THE DRAWINGS

FIG. 8B is a graph illustrating an output of a sound when the button press duration is shorter than the playback length of the sound source A according to the second example of the present invention;

FIG. 10 is a flowchart describing an operation of the input display device according to the second example of the present invention.

DESCRIPTION OF THE PREFERRED EMBODIMENTS

In one embodiment, the first sound signal is different from the second sound signal. In one embodiment, the circuitry includes a first sound source configured to generate the first sound signal, and a second sound source configured to generate the second sound signal. In one embodiment, the circuitry is configured to set a silent duration between an output of the first sound signal and an output of the second sound signal. In one embodiment, the circuitry is further configured to measure a duration of a condition in which the operating object is in the proximity to the floating image in response to the detection of the first event, and cause the first sound signal to fade out when the measured duration is shorter than a playback length of the first sound signal. In one embodiment, the circuitry is configured to insert a silent duration between the faded-out first sound signal and the second sound signal, and output the second sound signal after the silent duration. In one embodiment, the circuitry is further configured to measure a duration of a condition in which the operating object stays away from the floating image in response to the detection of the second event, and cause the second sound signal to fade out when the measured duration is shorter than a playback length of the second sound signal. In one embodiment, the circuitry is configured to insert a silent duration between the faded-out second sound signal and the first sound signal, and output the first sound signal after the silent duration.

According to the present disclosure, since the first sound signal is output when the operating object comes in proximity to the floating image and the second sound signal is output when the operating object away image, moves from the floating interactivity at the time of an input operation to the floating image is improved, and a high tactile feedback and confirmation feeling can be fed back to the user.

An input display device according to the present disclosure displays a floating image using retroreflection in a three-dimensional space visible without wearing special glasses or the like. The input display device according to the present invention also enables to provide a non-contact user interface with high interactivity regarding the floating image. It should be noted that the drawings referred to in the following description of the examples include exaggerated representations to facilitate understanding of the invention and do not represent an actual shape or scale of the product.

EXAMPLES

Figure 2A:
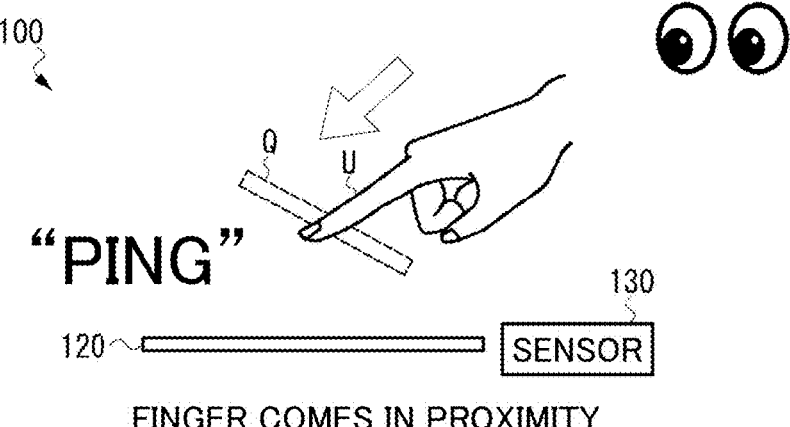
FIG. 2A is a drawing describing a response of an input display device when a user's finger is in proximity to a floating image according to a first example of the present invention.
Figure 2B:
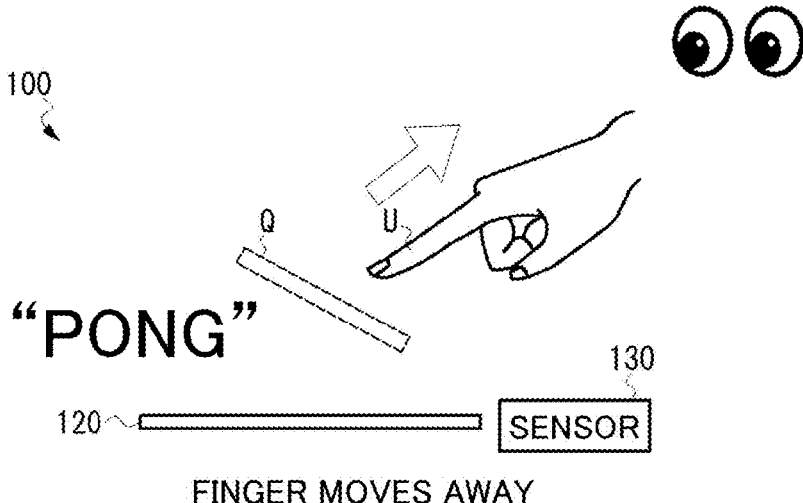
FIG. 2B is a drawing describing a response of the input display device when the user's finger moves away from the floating image according to the first example of the present invention.

Next, examples of the present invention will be described in detail. FIG. 2A and FIG. 2B are drawings illustrating an outline of the input display device according to the first example of the present invention. In the input display device 100 of the present example, for example, when the floating image Q is displayed above a beam splitter 120 mounted on an upper surface of a housing, as shown in FIG. 2A, the input display device outputs a "ping" sound when the user's finger U passes near the floating image Q, and again outputs a "pong" sound when the user's finger U moves away from the floating image Q, as shown in FIG. 2B. The proximity of the finger U to the floating image Q and the finger U moving away from there are detected by a sensor 130.

The sound to be output when the finger comes in proximity to the floating image Q and the sound to be output when the finger moves away from the floating image Q only need to be different sounds, and the combination of sounds may be optional. For example, in addition to the above combination of "ping" and "pong", a combination of simple bell sounds with different frequencies or melodies may be used. The combination of sound levels may also be optional. For example, the sound to be output when the finger comes in proximity may be made louder or quieter than the sound to be sounded when the finger moves away. Furthermore, the combination of output sound length may also be optional. For example, the sound output when the finger comes in proximity may be longer or quieter than the sound output when the finger moves away.

It is also possible to prepare a plurality of combinations of sounds. For example, as shown in Related Art FIG. 1A, when a plurality of numbers 1, 2, 3, and 4 are displayed as floating images Q, and the user brings the finger to the proximity of one of the numbers to select, it is possible to make different sounds corresponding to operations on respective numbers. For example, a frequency of the sound output when operating the number 1 is relatively high, and a frequency of the sound output when operating the number 2 is relatively low.

Furthermore, when the sound is output when the user's finger comes in proximity to the floating image Q and moves away from the floating image Q, it is possible to change the image of the floating image in conjunction with the sound. For example, when the user's finger comes in proximity to the floating image Q, a color of the floating image changes, or the color becomes darker, and the image returns to the original color when the finger moves away.

Thus, according to the present example, by generating different sounds twice in conjunction with movements to the proximity of the floating image Q and away from the floating image Q when performing a non-contact operation to the floating image Q, an interactivity is enhanced and the tactile feedback and confirmation feeling during an input operation can be more effectively fed back to the operator. Moreover, by generating different sounds twice, a cross-modal effect of hearing can be enhanced. Furthermore, by allowing optional combinations of sounds, it becomes possible to create sound effects that match images and functions across various scenes.

Figure 3:
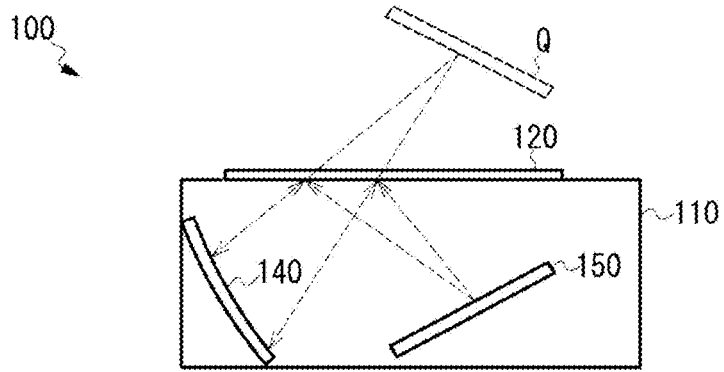
FIG. 3 is a drawing illustrating a configuration example of an optical system of the input display device according to the first example of the present invention.

Next, a specific configuration of the input display device 100 of the present example will be described. FIG. 3 is a drawing illustrating a configuration example of an optical system of the input display device 100. In the input display device 100, for example, the beam splitter 120 is attached to the upper surface of a rectangular housing 110, and a retroreflecting member 140 and a light source 150 are arranged inside the beam splitter 120, and the floating image Q is displayed above the beam splitter 120.

The beam splitter 120 is an optical member that separates incident light into transmitted light and reflected light. For example, a half mirror or a polarized beam splitter is used when polarized light is used.

The retroreflecting member 140 is an optical member that reflects light in a same direction as the incident light and is composed of, for example, a prismatic retroreflecting element such as a triangular pyramidal retroreflecting element or full cube corner retroreflecting element or a bead retroreflecting element. The retroreflecting member 140 in the example has a curved or spherical retroreflecting surface, but the retroreflecting surface may be a flat surface.

As long as the light source 150 has a function of generating a video or an image of the design P, which is an original image of the floating image Q, its configuration is not particularly limited. The design P may be a display of various types of buttons such as letters, figures, and icons, or not only a still image but also a moving image. The light source 150 may be, for example, a display light source such as a liquid crystal display device, an organic EL display device, a projection type display device, or an LED light source. In addition, an opening or a through-hole for generating the design P may be formed in the retroreflecting member, and the back of the retroreflecting member may be illuminated by the LED light source.

The light (design P) emitted from the light source 150 is incident on the beam splitter 120, the light reflected therefrom is retroreflected by the retroreflecting member 140, the retroreflected light passes through the beam splitter 120, and the transmitted light forms the image to generate the floating image Q. The floating image Q is displayed in a position symmetrical to the light source 150 with respect to the beam splitter 120, and the user can visually recognize the floating image Q within a range where the user can observe the retroreflecting member 140.

Figure 4:
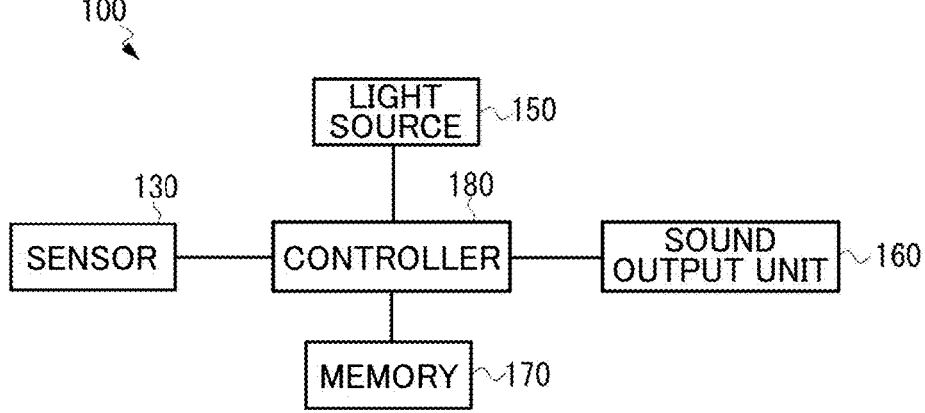
FIG. 4 is a block diagram illustrating an electrical configuration of the input display device according to the first example of the present invention.

FIG. 4 is a block diagram illustrating an electrical configuration of the input display device 100 of the present example. The input display device includes the sensor 130 for detecting the finger U that comes in proximity to the floating image Q or the finger U moving away from the floating image Q, the light source 150 for generating the design P, a sound output unit 160 for outputting sound from a speaker, a memory 170, and a controller 180.

The configuration of the sensor 130 is not particularly limited as long as it can detect the proximity or moving away of the finger U of the floating image Q. The sensor 130 may include, for example, a distance measuring sensor for measuring the three-dimensional position of the finger U, a stereo camera, a capacitance sensor, or the like. The distance measuring sensor includes, for example, a combination of an infrared light emitting element and an infrared light receiving element, and can detect the three-dimensional position of the finger U on the housing 110 based on the reflected light from the finger U to which infrared rays are irradiated. The stereo camera captures images of the finger U in the housing 110 from left and right directions, and can detect the three-dimensional position of the finger U by analyzing the captured image data. The capacitance sensor is a touch panel mounted on, for example, a liquid crystal display device, and the touch panel is mounted on, for example, the upper surface of the housing 110, and can detect an XY coordinate of the finger U and a Z coordinate, which is a distance from the upper surface of the housing 110. The detection result of the sensor 130 is provided to the controller 180.

Figure 1A:
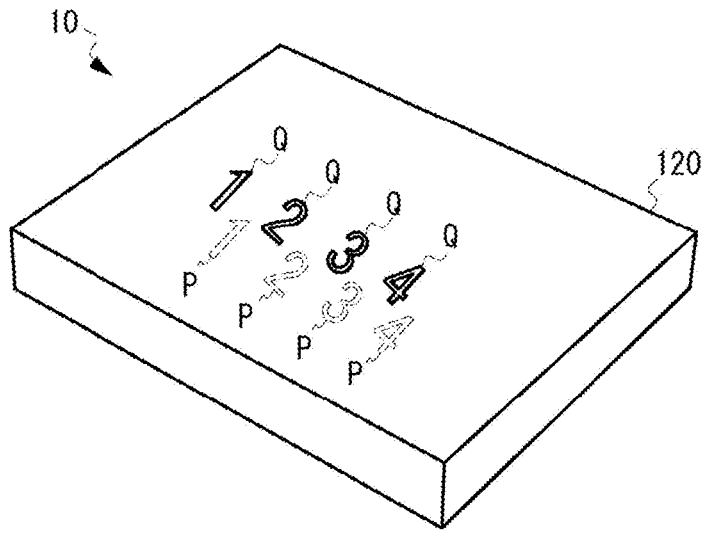
FIG. 1A is a perspective view illustrating an example of a conventional input display device.
Figure 1B:
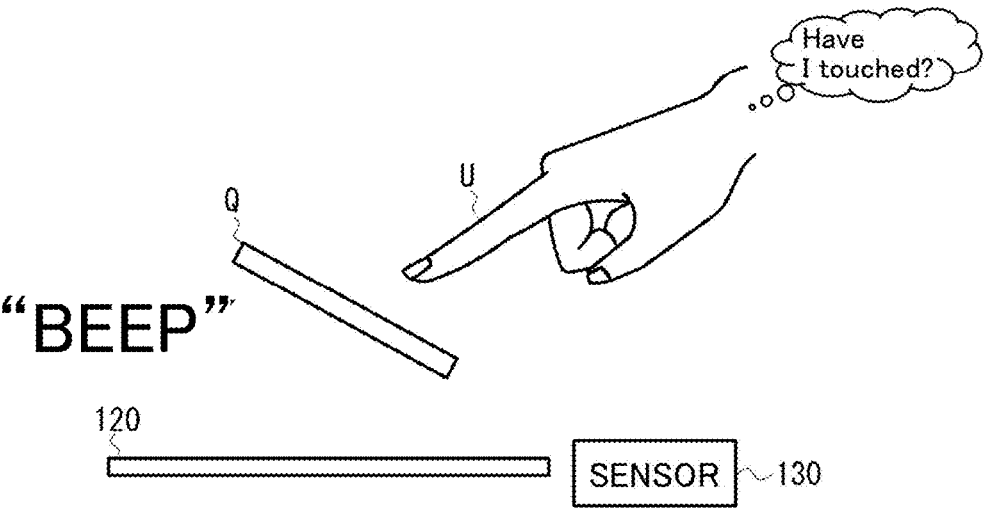
FIG. 1B is a drawing illustrating an example of an operation on a floating image of the input display device.

The memory 170 stores audio data of the sound source A for outputting sound when the finger comes in proximity to the floating image Q and audio data of the sound source B for outputting sound when the finger moves away from the floating image Q. A type and format of the audio data of the sound source A and the sound source B are optional. The controller 180 is a circuit that controls an overall operation of the input display device 100, and includes, for example, a microcontroller or microprocessor including a ROM/RAM, and controls the operation by a program stored in the ROM/RAM. The controller 180 also holds the three-dimensional coordinates of the displayed floating image Q. The three-dimensional coordinates of the floating image Q can be determined geometrically from the three-dimensional coordinates of the beam splitter 120 and the light source 150. For example, the three-dimensional coordinates of each of 1, 2, 3, and 4 of the floating images Q shown in Related Art FIG. 1A are known in the controller 180.

Figure 5:
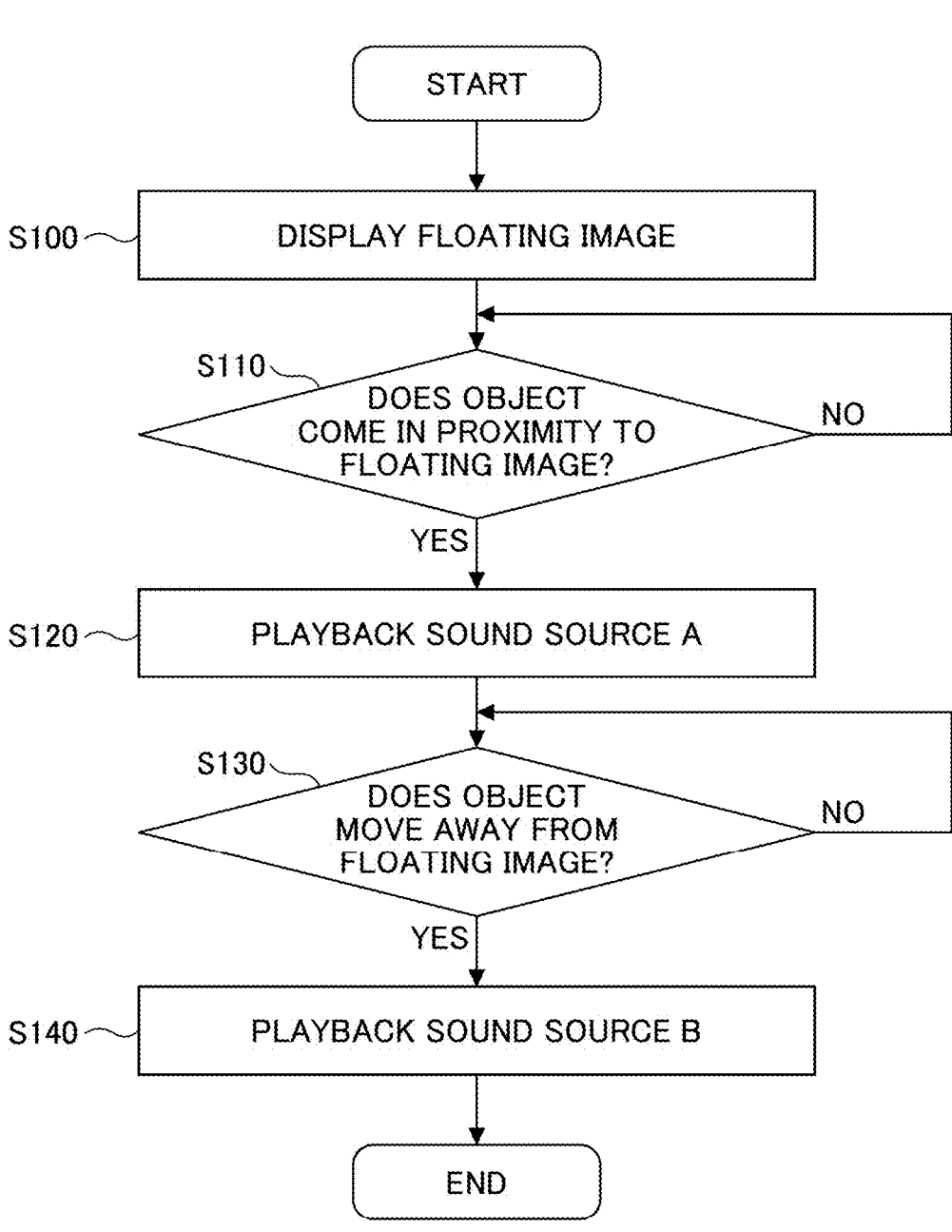
FIG. 5 is a flowchart describing the operation of the input display device according to the first example of the present invention.

FIG. 5 is a flowchart describing the operation of the input display device 100. The controller 180 drives the light source 150 to display the floating image Q of the design P (S100). Thus, the user visually recognizes the floating image Q in their line of sight. The floating image Q is an image or a video for the user to perform the input operation, and the floating image Q may be referred to herein as a button for the user to perform the input operation.

The controller 180 receives the detection result from the sensor 130 and determines whether the user's finger U comes in proximity to the floating image Q (S110). For example, when the sensor 130 is a capacitance-type touch panel, and the touch panel is mounted on the upper surface of the housing 110 and the finger U comes in proximity to the housing 110, the three-dimensional position of the finger U can be detected by the change in capacitance. When the distance D1 between the position of the finger U detected by the sensor 130 and the position of the floating image Q decreases and the distance D1 reaches a first threshold or less (D1≤first threshold), the controller 180 determines that the finger U has come in proximity to the floating image Q.

When the controller 180 determines that the finger U has come in proximity to the floating image Q, the controller 180 reads the audio data of the sound source A from the memory 170 and provides the playback data of the sound source A to the sound output unit 160. As a result, the sound of the sound source A is output from the speaker (S120).

Next, the controller 180 monitors the detection result of the sensor 130 and determines whether or not the finger U has moved away from the floating image Q (S130). For example, when the distance D2 between the position of the finger U and the position of the floating image Q increases and the distance D2 becomes equal to or greater than a second threshold (D2≥second threshold), the controller 180 determines that the finger U has moved away from the floating image Q.

When the controller 180 determines that the finger U has moved away from the floating image Q, the controller 180 reads the audio data of the sound source B from the memory 170 and provides the playback data of the sound source B to the sound output unit 160. Thus, the sound of the sound source B is output from the speaker (S140). When providing the playback data of the sound source B to the sound output, the controller 180 may set a blank duration (silence) for a certain duration, and provide the playback data of the sound source B after the blank duration has elapsed. Thus, the user can clearly recognize the boundary between the sound of the sound source A and the sound of the sound source B.

Next, the second example of the present invention will be described. In the first example, the sound source A is reproduced when the finger comes in proximity to the floating image Q, and the sound source B is reproduced when the finger moves away from the floating image Q. However, depending on the time during which the user presses the button (the floating image Q) with the finger U, the sound of the sound source A may be interrupted or the boundary between the sound of the sound source A and the sound of the sound source B may be difficult to hear.

Figure 6A:
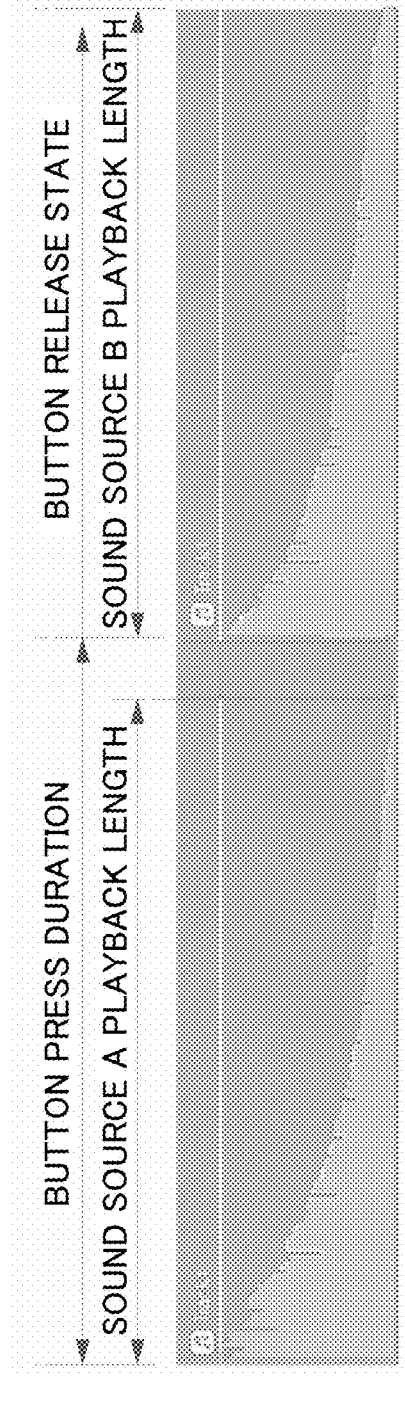
FIG. 6A is a graph illustrating a waveform of a sound when button press duration≥sound source A playback length according to the first example of the present invention.
Figure 6B:
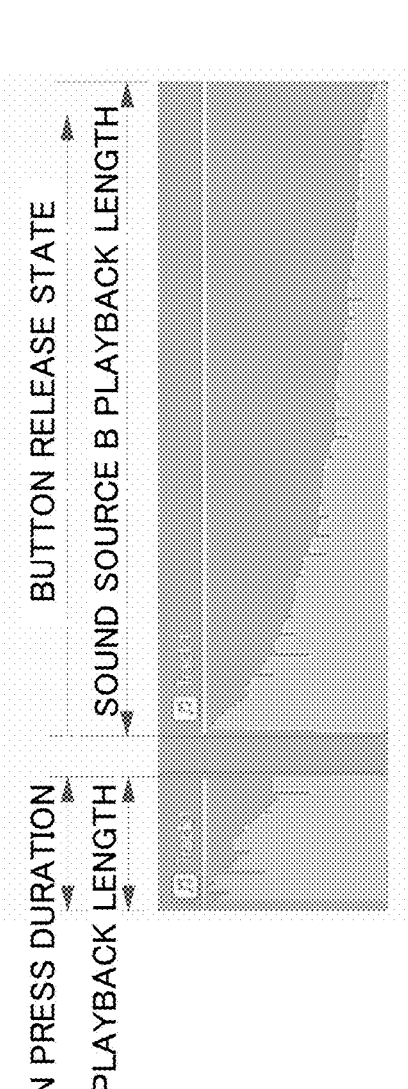
FIG. 6B is a graph illustrating a waveform of a sound when button press duration<sound source A playback length according to the first example of the present invention.

FIG. 6A is a graph illustrating a waveform of a sound when button press duration≥sound source A playback length, and FIG. 6B is a graph illustrating a waveform of a sound when button press duration<sound source A playback length. The vertical axis is the amplitude, and the horizontal axis is the time.

As shown in FIG. 6A, when the button press duration (floating image Q) is longer than the playback length of the sound source A, the sound of the sound source A is output within the button press duration, so that the sound of the sound source A is naturally separated from the sound of the sound source B output when the finger is moved away from the button, and there is no sense of incongruity. For example, the "ping" of the sound source A and the "pong" of the sound source B are naturally heard.

Conversely, as shown in FIG. 6B, when the button press duration is shorter than the playback length of the sound source A, the sound source B is played back in the middle of the playback of the sound source A, and there is a sense of incongruity. For example, the "ping" of the sound source A is interrupted, and there are "pi" "pong" sounds.

Figure 7A:
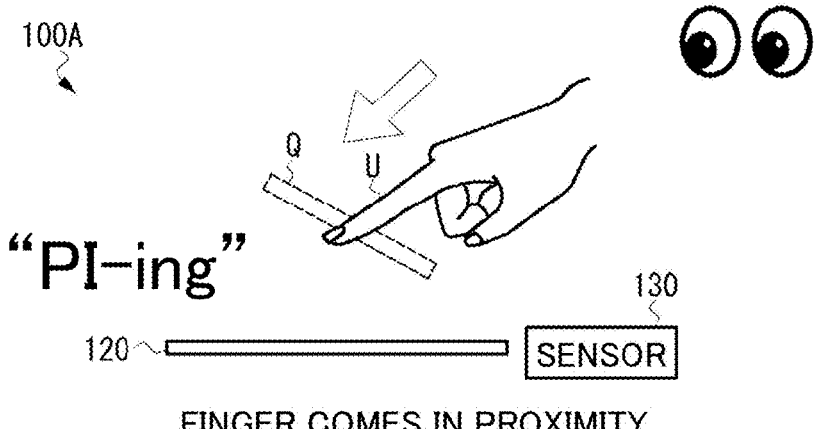
FIG. 7A is a drawing describing a response of an input display device when the user's finger comes in proximity to a floating image according to a second example of the present invention.
Figure 7B:
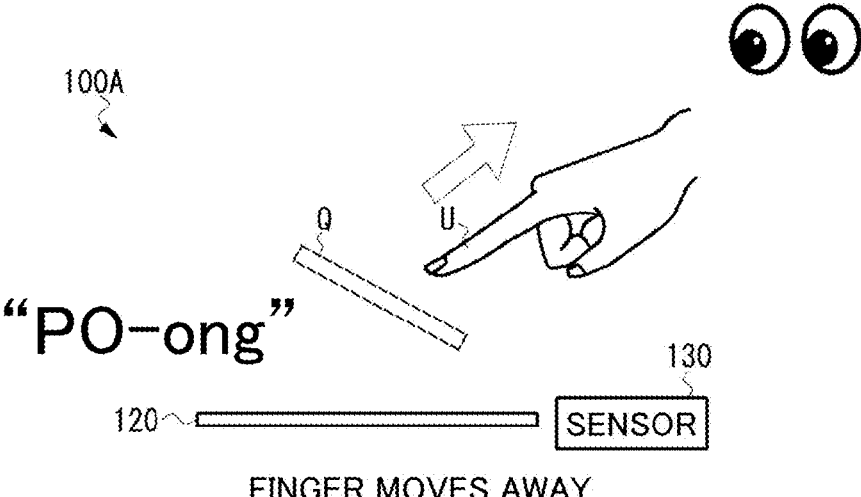
FIG. 7B is a drawing describing a response of the input display device when the user's finger moves away from the floating image according to the second example of the present invention.

Therefore, in the second example, when the button press duration is shorter than the playback length of the sound source A, the sounds of the sound source A and the sound source B are played back without incongruity. FIGS. 7A and 7B are a drawing describing an outline of an input display device 100A of the second example. FIG. 7A shows the operation when the finger comes in proximity, and FIG. 7B shows the operation when the finger moves away.

(1) Button Pressed: The Sound Source A is Played Back.

The time during which the button is pressed is extended while fading the volume. As shown in FIG. 7A, for example, a "pi-ing" sound is heard. When sound source A playback time>button press duration, volume gradually decreases so that the end of playback of sound source A is faded out.

(2) Button Release State: The Sound Source B is Played Back.

In case of sound source A playback length>button press duration, when the playback of sound source B is performed after fading out the sound source A, a blank duration (silent duration) is inserted immediately before the playback of sound source B.

Thus, when the button press duration is shorter than the playback length of sound source A, the interruption of the sound source A is prevented by fading out the sound source A, and the sound of sound source A and sound source B can be heard more naturally without incongruity by inserting the blank duration.

Figure 8A:
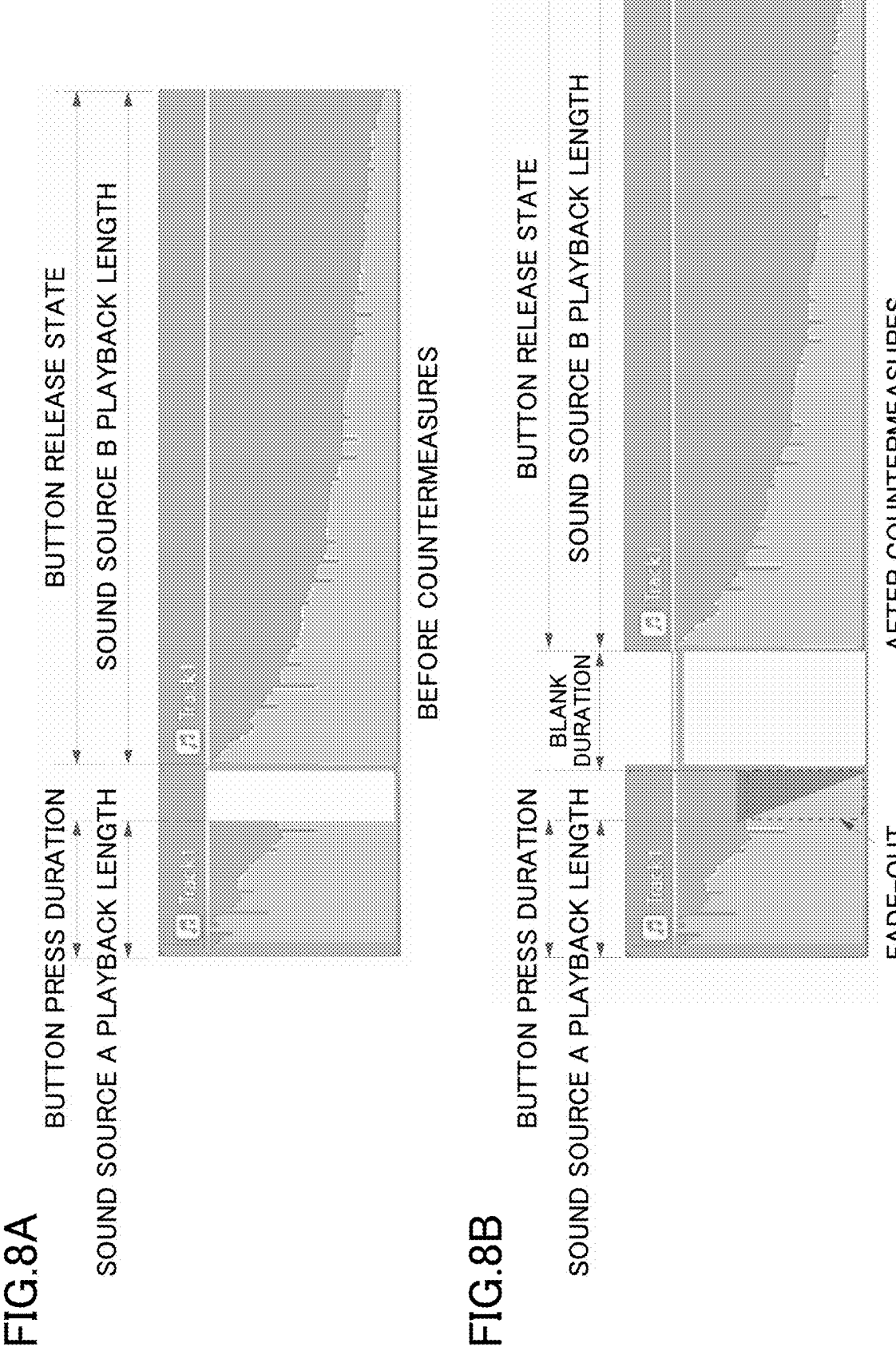
FIG. 8A is a graph illustrating an output of a sound before countermeasures when the button press duration is shorter than the playback length of the sound source A according to the second example of the present invention.

FIG. 8A is a graph illustrating an output of a sound before countermeasures when button press duration<sound source A playback length, and FIG. 8B is a graph illustrating the output waveform of sound after countermeasures when button press duration<sound source A playback length.

As shown in FIG. 8A, when the button press duration is shorter than the playback length of the sound source A, the sound source B is played back at a timing when the finger moves away from the button, and the sound of the sound source A is interrupted in the middle. However, as shown in FIG. 8B, in the second example, when the button press duration is shorter than the playback length of the sound source A, in order to prevent the sound of the sound source A from being interrupted in the middle, the playback signal is faded out so that the volume gradually decreases at the end of the sound source A, and a blank duration (silent duration) is inserted immediately before the playback of the sound source B, and the sound source B is reproduced after the blank duration.

Figure 9A:
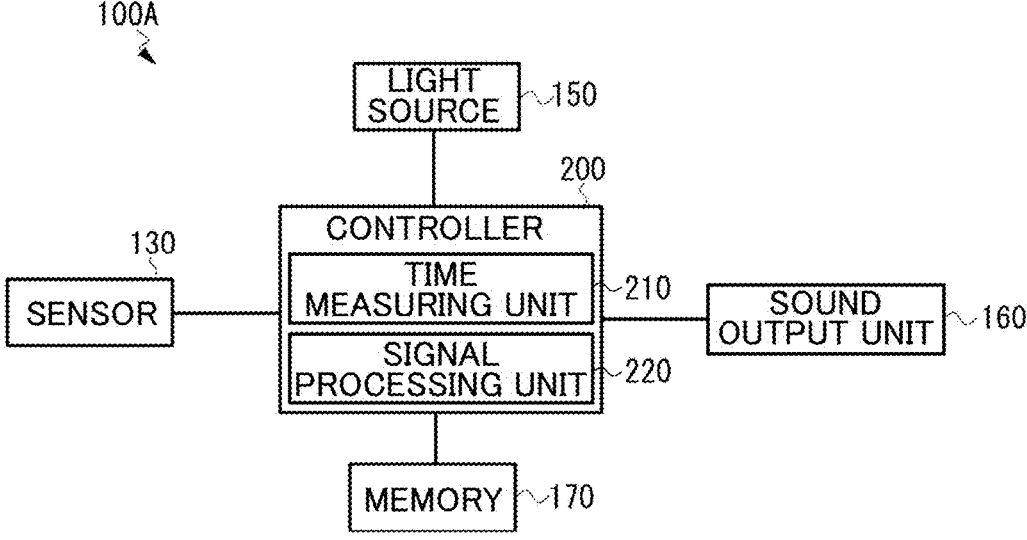
FIG. 9A is a block diagram illustrating an electrical configuration of the input display device according to the second example of the present invention.

FIG. 9A is a block diagram illustrating an electrical configuration of the input display device according to the second example, and the same reference numerals are given for the same configuration as in the first example. In the second example, the controller 200 includes a time measuring unit 210 for measuring the button press duration (i.e., the time as of detecting the finger U coming in proximity to the floating image) and non-press duration, which is a duration of a button release state, or a time when the button is not pressed (i.e., the time as of detecting the finger U moving away from the floating image), and a signal processing unit 220 for processing the playback signals of the sound source A and the sound source B.

FIG. 10 is a flowchart describing an operation of the input display device according to the second example. While the floating image Q is displayed, the controller 200 monitors whether the button (floating image Q) is pressed based on the detection result of the sensor 130 (S200). That is, it monitors whether the distance D1 between the position of the finger U and the position of the floating image Q decreases and whether the distance D1 reaches a first threshold or less (D1≤first threshold).

When the controller 200 determines that the button is pressed, as in the first example, the controller 200 reads the audio data of the sound source A from the memory 170, provides the playback data of the sound source A to the sound output unit 160, and outputs the sound of the sound source A from the sound output unit 160 (S210). In parallel with this, the controller 200 causes the time measuring unit 210 to measure the button press duration when the distance D1 reaches the first threshold (S220). When the distance D1 between the finger U and the floating image Q starts to increase, or when the distance D1 becomes larger than the first threshold, the controller 200 considers that the button pressing is finished, and measurement by the time measuring unit 210 ends.

Next, the controller 200 determines whether or not button press duration≥sound source A playback length holds based on the measurement result of the time measuring unit 210 (S230), and when the button press duration is longer than the playback length of the sound source A, the controller 200 monitors whether the finger moves away from the button (S240). That is, it monitors whether or not the distance D2 between the position of the finger U and the position of the floating image Q increases and whether the distance D2 is equal to or greater than the second threshold (D2≥the second threshold).

When button press duration≥sound source A playback length does not hold, that is, when the controller 200 determines that the button press duration is shorter than the playback length of the sound source A (S230), the controller 200 monitors whether or not the finger moves away from the button in the same manner as in step S240 (S250). When it determines that the finger has moved away from the button, the controller 200 causes the signal processing unit 220 to fade out the playback signal of the sound source A so that the volume of the sound source A gradually decreases (S260). As a result, the sound output unit 160 outputs the faded-out sound of the sound source A.

In response to the finger moving away from the button (S240, S250), the controller 200 reads the data of the sound source B from the memory 170, inserts a certain blank duration (silent duration) before providing the playback data of the sound source B to the sound output unit 160 (S270), and then provides the playback signal of the sound source B to the sound output unit 160. As a result, the sound of the sound source B is output from the sound output unit 160 (S280).

In parallel with the sound output of the sound source B, the controller 200 causes the time measuring unit 210 to measure the non-press duration during which the button is not pressed at the timing when the distance D2 reaches the second threshold (S290). When the distance D2 between the finger U and the floating image Q decreases or when the distance D2 becomes smaller than the second threshold, the controller 200 regards the non-press duration of the button as the end and terminates the measurement by the time measuring unit 210.

Next, the controller 200 determines whether of not button non-press duration≥sound source B playback length holds based on the measurement result of the time measuring unit 210 (S300), and when the button non-press duration is longer than the playback length of the sound source B, the controller 200 causes the signal processing unit 220 to insert a blank duration (S310) and terminates the processing.

Conversely, when the button non-press duration is shorter than the playback length of the sound source B (S300), the controller 200 monitors whether or not the button is pressed (S320). This monitoring is the same process as step S200. When it is determined that the button is pressed (S320), the controller 200 causes the signal processing unit 220 to fade out the playback signal of the sound source B so that the volume of the sound source B gradually decreases (S330). Thus, the faded-out sound of the sound source B is output from the sound output unit 160.

In response to the button being pressed (S320), the controller 200 reads the audio data of the sound source A from the memory 170, inserts a certain blank duration (silent duration) before providing the playback data of the sound source A to the sound output unit 160 (S340), and then provides the playback signal of the sound source A to the sound output unit 160. Thus, the sound of the sound source A is output from the sound output unit 160 (S210). The processing after step S220 is the same as above.

Figure 9B:
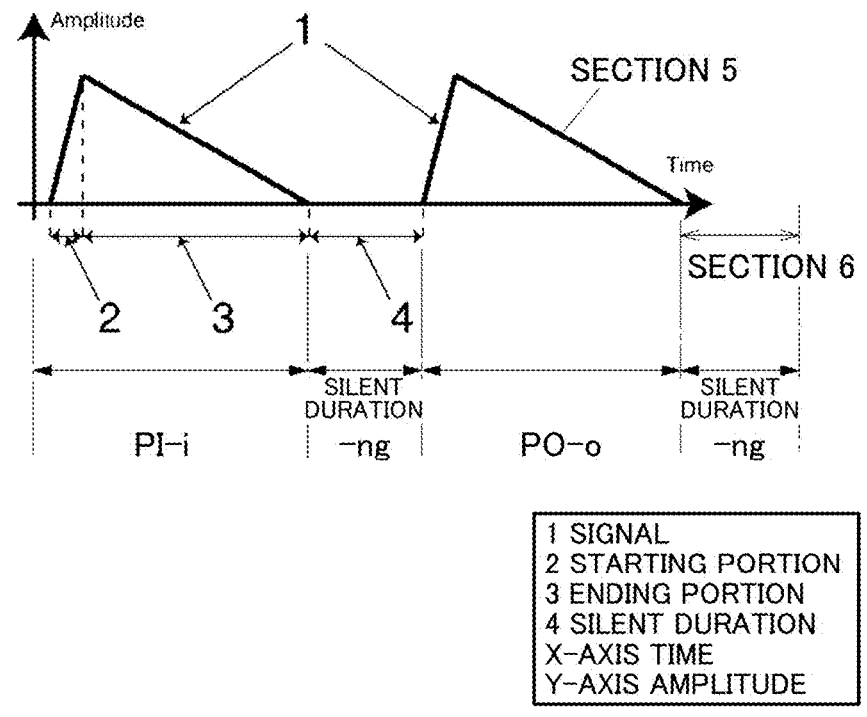
FIG. 9B is a drawing illustrating an amplitude waveform a sound sign defined by an international standard.

A sound component (ping-pong) that is easy to hear for the hearing impaired or the like is defined as a sound sign by international standards. FIG. 9B shows the amplitude waveform of a sound sign guidance for in a public facility defined by international standards. In the figure, 1 refers to audio signals, 2 refers to a starting portion, 3 refers to an ending portion, 4 refers to a silent duration, x-axis refers to time, and y-axis refers to amplitude.

The fade-out processing of the volume of the sound source A of the present example (S260) corresponds to section 3 in FIG. 9B, the insertion of the blank duration (S270) corresponds to section 4, the fade-out processing of the volume of the sound source B (S330) corresponds to section 5, and the insertion of the blank duration (S340) corresponds to section 6. The silence section of sections 4 and 6 corresponds to " . . . ng", or quiet sound in "ping-pong". Thus, the sound output during the operation of the floating image according to the present example conforms to international standards.

When the button press duration is short, a sound that is easy to hear and not incongruous can be realized by fading the volume of the first sound source A (the ping part) and inserting the blank duration before the playback of the second sound source B (the pong part). Moreover, since the sound is linked with the operation, a sufficient tactile feedback can be obtained.

The input display device of the present example can be applied to the display of information of any equipment and user input. For example, it can be applied to computer equipment, in-vehicle electronic equipment, ATMs of banks, etc., ticket buying machines of stations, etc., input buttons of elevators, etc.

Further, the present invention is not limited to these embodiments, and various variations and modifications may be made without departing from the scope of the present invention.

What is claimed is:

1. An input display device for displaying a floating image by utilizing retroreflection, comprising circuitry configured to:
   detect a first event in which an operating object comes in proximity to the floating image;
   detect a second event in which the operating object moves away from the floating image;
   output a first sound signal in response to detection of the first event;
   output a second sound signal in response to detection of the second event;
   measure a duration of a condition in which the operating object is in the proximity to the floating image in response to the detection of the first event; and
   cause the first sound signal to fade out when the measured duration is shorter than a playback length of the first sound signal.

2. The input display device according to claim 1, wherein the first sound signal is different from the second sound signal.

3. The input display device according to claim 1, wherein the circuitry includes a first sound source configured to generate the first sound signal, and a second sound source configured to generate the second sound signal.

4. The input display device according to claim 1, wherein the circuitry is configured to set a silent duration between an output of the first sound signal and an output of the second sound signal.

5. The input display device according to claim 1, wherein the circuitry is configured to insert a silent duration between the faded-out first sound signal and the second sound signal, and output the second sound signal after the silent duration.

6. An input display device for displaying a floating image by utilizing retroreflection, comprising circuitry configured to:
   detect a first event in which an operating object comes in proximity to the floating image;
   detect a second event in which the operating object moves away from the floating image;
   output a first sound signal in response to detection of the first event;
   output a second sound signal in response to detection of the second event;
   measure a duration of a condition in which the operating object stays away from the floating image in response to the detection of the second event; and
   cause the second sound signal to fade out when the measured duration is shorter than a playback length of the second sound signal.

7. The input display device according to claim 6, wherein the circuitry is configured to insert a silent duration between the faded-out second sound signal and the first sound signal, and the circuitry is configured to output the first sound signal after the silent duration.

8. The input display device according to claim 6, wherein the first sound signal is different from the second sound signal.

9. The input display device according to claim 6, wherein the circuitry includes a first sound source configured to generate the first sound signal, and a second sound source configured to generate the second sound signal.

10. The input display device according to claim 6, wherein the circuitry is configured to set a silent duration between an output of the first sound signal and an output of the second sound signal.

\* \* \* \* \*